(12) United States Patent
Qiu

(10) Patent No.: US 8,296,302 B2
(45) Date of Patent: Oct. 23, 2012

(54) METHOD AND SYSTEM FOR EXTENDING CONTENT

(76) Inventor: Gang Qiu, Cupertino, CA (US)

( * ) Notice: Subject to any disclaimer, the term of this patent is extended or adjusted under 35 U.S.C. 154(b) by 558 days.

(21) Appl. No.: 12/434,855

(22) Filed: May 4, 2009

(65) Prior Publication Data

US 2009/0276420 A1 Nov. 5, 2009

(30) Foreign Application Priority Data

May 4, 2008 (CN) .......................... 2008 1 0105724

(51) Int. Cl.
*G06F 7/00* (2006.01)
*G06F 17/30* (2006.01)

(52) U.S. Cl. ......... 707/739; 707/729; 707/791; 707/802

(58) Field of Classification Search .................. 715/206; 707/705, 790
See application file for complete search history.

(56) References Cited

U.S. PATENT DOCUMENTS

| | | | | |
|---|---|---|---|---|
| 6,185,550 | B1 * | 2/2001 | Snow et al. ........................... | 1/1 |
| 6,199,067 | B1 * | 3/2001 | Geller .................................. | 1/1 |
| 6,862,710 | B1 * | 3/2005 | Marchisio ..................... | 715/206 |
| 6,907,431 | B2 * | 6/2005 | Lin ..................................... | 1/1 |
| 7,593,932 | B2 * | 9/2009 | Lindh et al. ......................... | 1/1 |
| RE41,899 | E * | 10/2010 | Rose et al. ..................... | 706/46 |
| 2002/0194176 | A1 * | 12/2002 | Gruenwald ...................... | 707/7 |
| 2003/0217033 | A1 * | 11/2003 | Sandler et al. .................... | 707/1 |
| 2004/0102958 | A1 * | 5/2004 | Anderson, IV ................... | 704/4 |
| 2004/0139072 | A1 * | 7/2004 | Broder et al. ..................... | 707/4 |
| 2005/0021517 | A1 * | 1/2005 | Marchisio ......................... | 707/4 |
| 2006/0235661 | A1 * | 10/2006 | Price ................................ | 703/2 |
| 2007/0074102 | A1 * | 3/2007 | Kraft et al. ..................... | 715/512 |
| 2007/0282809 | A1 * | 12/2007 | Hoeber et al. .................... | 707/3 |
| 2008/0016065 | A1 * | 1/2008 | Takaai et al. ..................... | 707/6 |
| 2008/0040098 | A1 * | 2/2008 | Suzuki ............................. | 704/4 |
| 2009/0182730 | A1 * | 7/2009 | Krishnamoorthy et al. ...... | 707/5 |

\* cited by examiner

*Primary Examiner* — Giovanna Colan

(57) ABSTRACT

The present invention provides a method and system for extending content based on the semantic meaning of content. It divides content into multiple content regions and finds words and/or phrases that are semantically relevant to the current content region and appends these words and/or phrases to the current content region as extended content. The extended content matches semantically with the original content in such a seamless way that users may think it is a part of the content.

21 Claims, 17 Drawing Sheets

| Label | Titles |
|---|---|
| B1 | A Course on Integral Equations |
| B2 | Attractors for Semigroups and Evolution Equations |
| B3 | Automatic Differentiation of Algorithms: Theory, Implementation, and Application |
| B4 | Geometrical Aspects of Partial Differential Equations |
| B5 | Ideals, Varieties, and Algorithms – An Introduction to Computational Algebraic Geometry and Commutative Algebra |
| B6 | Introduction to Hamiltonian Dynamical Systems and the N-Body Problem |
| B7 | Knapsack Problems: Algorithms and Computer Implementations |
| B8 | Methods of Solving Singular Systems of Ordinary Differential Equations |
| B9 | Nonlinear Systems |
| B10 | Ordinary Differential Equations |
| B11 | Oscillation Theory for Neutral Differential Equations with Delay |
| B12 | Oscillation Theory of Delay Differential Equations |
| B13 | Pseudodifferential Operators and Nonlinear Partial Differential Equations |
| B14 | Sinc Methods for Quadrature and Differential Equations |
| B15 | Stability of Stochastic Differential Equations with Respect to Semi-Martingales |
| B16 | The Boundary Integral Approach to Static and Dynamic Contact Problems |
| B17 | The Double Mellin-Barnes Type Integrals and Their Applications to Convolution Theory |

| Label | Titles |
|---|---|
| B1 | A Course on Integral Equations |
| B2 | Attractors for Semigroups and Evolution Equations |
| B3 | Automatic Differentiation of Algorithms: Theory, Implementation, and Application |
| B4 | Geometrical Aspects of Partial Differential Equations |
| B5 | Ideals, Varieties, and Algorithms – An Introduction to Computational Algebraic Geometry and Commutative Algebra |
| B6 | Introduction to Hamiltonian Dynamical Systems and the $N$-Body Problem |
| B7 | Knapsack Problems: Algorithms and Computer Implementations |
| B8 | Methods of Solving Singular Systems of Ordinary Differential Equations |
| B9 | Nonlinear Systems |
| B10 | Ordinary Differential Equations |
| B11 | Oscillation Theory for Neutral Differential Equations with Delay |
| B12 | Oscillation Theory of Delay Differential Equations |
| B13 | Pseudodifferential Operators and Nonlinear Partial Differential Equations |
| B14 | Sinc Methods for Quadrature and Differential Equations |
| B15 | Stability of Stochastic Differential Equations with Respect to Semi-Martingales |
| B16 | The Boundary Integral Approach to Static and Dynamic Contact Problems |
| B17 | The Double Mellin-Barnes Type Integrals and Their Applications to Convolution Theory |

| Terms | Documents | | | | | | | | | | | | | | | | |
|---|---|---|---|---|---|---|---|---|---|---|---|---|---|---|---|---|---|
| | B1 | B2 | B3 | B4 | B5 | B6 | B7 | B8 | B9 | B10 | B11 | B12 | B13 | B14 | B15 | B16 | B17 |
| algorithms | 0 | 0 | 1 | 0 | 1 | 0 | 1 | 0 | 0 | 0 | 0 | 0 | 0 | 0 | 0 | 0 | 0 |
| application | 0 | 0 | 1 | 0 | 0 | 0 | 0 | 0 | 0 | 0 | 0 | 0 | 0 | 0 | 0 | 0 | 1 |
| delay | 0 | 0 | 0 | 0 | 0 | 0 | 0 | 1 | 0 | 1 | 1 | 1 | 1 | 1 | 0 | 0 | 0 |
| differential | 0 | 0 | 0 | 1 | 0 | 0 | 0 | 1 | 0 | 1 | 1 | 1 | 1 | 1 | 1 | 0 | 0 |
| equations | 1 | 1 | 0 | 1 | 0 | 0 | 1 | 1 | 0 | 0 | 1 | 1 | 1 | 0 | 0 | 0 | 0 |
| implementation | 0 | 0 | 1 | 0 | 0 | 0 | 0 | 0 | 0 | 0 | 0 | 0 | 0 | 0 | 0 | 0 | 1 |
| integral | 1 | 0 | 0 | 0 | 1 | 1 | 0 | 0 | 1 | 0 | 0 | 0 | 0 | 0 | 0 | 1 | 0 |
| introduction | 0 | 0 | 0 | 0 | 0 | 0 | 0 | 1 | 0 | 0 | 0 | 0 | 0 | 1 | 0 | 0 | 0 |
| methods | 0 | 0 | 0 | 0 | 0 | 0 | 0 | 1 | 1 | 1 | 1 | 0 | 1 | 0 | 0 | 0 | 0 |
| nonlinear | 0 | 0 | 0 | 0 | 0 | 0 | 0 | 0 | 0 | 0 | 0 | 0 | 0 | 1 | 0 | 0 | 0 |
| ordinary | 0 | 0 | 0 | 1 | 0 | 0 | 0 | 0 | 0 | 0 | 1 | 1 | 1 | 0 | 0 | 0 | 0 |
| oscillation | 0 | 0 | 0 | 0 | 0 | 1 | 1 | 0 | 1 | 0 | 0 | 0 | 0 | 0 | 0 | 1 | 0 |
| partial | 0 | 0 | 0 | 0 | 0 | 1 | 1 | 0 | 1 | 0 | 1 | 1 | 1 | 0 | 0 | 0 | 0 |
| problem | 0 | 0 | 0 | 0 | 0 | 0 | 0 | 1 | 0 | 0 | 0 | 0 | 0 | 0 | 0 | 0 | 0 |
| systems | 0 | 0 | 0 | 0 | 0 | 0 | 0 | 0 | 0 | 0 | 1 | 1 | 0 | 0 | 0 | 1 | 0 |
| theory | 0 | 0 | 1 | 0 | 0 | 0 | 0 | 0 | 0 | 0 | 0 | 1 | 0 | 0 | 0 | 0 | 1 |

$A_k$ = $U$ $\Sigma$ $V^T$

Term Vectors

Document Vectors m × n    m × r    r × r    r × n

FIG. 3

$$\begin{pmatrix} 0.0159 & -0.4317 \\ 0.0266 & -0.3756 \\ 0.1785 & -0.1692 \\ 0.6014 & 0.1187 \\ 0.6691 & 0.1209 \\ 0.0148 & -0.3603 \\ 0.0520 & -0.2248 \\ 0.0066 & -0.1120 \\ 0.1503 & 0.1127 \\ 0.0813 & 0.0672 \\ 0.1503 & 0.1127 \\ 0.1785 & -0.1692 \\ 0.1415 & 0.0974 \\ 0.0105 & -0.2363 \\ 0.0952 & 0.0399 \\ 0.2051 & -0.5448 \end{pmatrix}$$

FIG. 4

$$\begin{pmatrix} 0.0511 & -0.3337 \end{pmatrix} = \begin{pmatrix} 0 \\ 1 \\ 0 \\ 0 \\ 0 \\ 0 \\ 0 \\ 0 \\ 0 \\ 0 \\ 0 \\ 0 \\ 0 \\ 0 \\ 0 \\ 1 \end{pmatrix}^T \begin{pmatrix} 0.0159 & -0.4317 \\ 0.0266 & -0.3756 \\ 0.1785 & -0.1692 \\ 0.6014 & 0.1187 \\ 0.6691 & 0.1209 \\ 0.0148 & -0.3603 \\ 0.0520 & -0.2248 \\ 0.0066 & -0.1120 \\ 0.1503 & 0.1127 \\ 0.0813 & 0.0672 \\ 0.1503 & 0.1127 \\ 0.1785 & -0.1692 \\ 0.1415 & 0.0974 \\ 0.0105 & -0.2363 \\ 0.0952 & 0.0399 \\ 0.2051 & -0.5448 \end{pmatrix} \begin{pmatrix} 4.5314 & 0 \\ 0 & 2.7582 \end{pmatrix}^{-1}$$

FIG. 6

Document 1

And while it's hard to predict demand for the Pre, preliminary analysis suggests Palm (PALM) will make a healthy profit from the units it does sell. Judging from a preliminary estimate by market researcher iSuppli, the Pre will cost about $138 to build. That would amount to 46% of the $300 iSuppli expects Palm to charge Sprint for the device; Sprint is likely to sell the handset for $200, after a $100 subsidy, iSuppli speculates. Palm declined to comment on iSuppli's analysis. ←p11 nokia | motorola | research in motion | msft ←e11

Researchers at iSuppli typically conduct teardown analyses of popular consumer electronic devices to estimate their costs and identify key suppliers. This analysis is an estimate, however, because there is not yet a product to tear down. So far, iSuppli has been able to identify two suppliers, says iSuppli analyst Tina Teng. Chipmaker Texas Instruments (TXN) is supplying Palm with an $11 applications chip from the so-called OMAP family of chips aimed at handsets, and wireless-chip maker Qualcomm (QCOM) is the most likely supplier of a set of wireless chips that will let the Pre run on Sprint's wireless voice and data network. Other suppliers are not definitively known. ←p12 cell-phone | smart phone | computer maker | consumer electronics ←e12

FIG. 7

Document 2

But whatever the outcome, this bit of brinkmanship — which many characterized as a game of chicken with Washington — has become yet another public relations disaster for Wall Street. ←p21

Representatives for Perella Weinberg, which is advising the government on a wide range of banking issues, initially defended the firm's decision to rebuff the government's offer. They characterized the move as a principled stance against the administration' s growing intrusion into American business. Many in the financial and in the legal worlds said the investors were within their rights to challenge the proposal. ←p22 hardball | miscalculation | turnabout | berman ←e21

OppenheimerFunds, in a statement, said: "Our holdings in secured Chrysler debt are entitled to priority in long-established U.S. bankruptcy law, and we are obligated to our fund shareholders to support agreements that respect these laws." ←p23

But now that Chrysler has tipped into bankruptcy, some industry executives worry the administration will try to turn this episode to its political advantage. Washington, these people contend, needed some political cover for the mess in Detroit — and Wall Street provided a handy scapegoat. A move is already afoot to tighten oversight of hedge funds and end certain tax benefits for private investments funds. The Chrysler bankruptcy, and Wall Street's role in it, will make resisting those efforts more difficult. ←p24

After weeks of increasingly rancorous negotiations, Perella Weinberg and 17 other financial firms — including OppenheimerFunds and Stairway Capital, a hedge fund that specializes in troubled companies — rejected the administration's plan. It was, they argued, simply unfair. ←p25 executive pay | executive compensation | accounting rule | pay package ←e22

The other creditors, who sought to distinguish themselves from those who have received bailout money, believed they had a stronger hand. Many of them bought Chrysler debt for about 30 cents on the dollar, long after it became clear that the company was in trouble. Most of this debt is secured by Chrysler assets — factories, equipment, real estate and the like. The thinking was that in the worst case, these assets could be sold at a profit if Chrysler were liquidated. ←p26 credit line | bondholder | financial adviser | insolvent ←e23

FIG. 9

Document 3

To say Palm has a lot riding on the Pre smartphone is an understatement. Amid stiff competition from Apple (AAPL) and Research In Motion (RIMM), Palm's very survival may hinge on the success of the device, expected to reach Sprint Nextel (S) store shelves no later than June 30. ←p31

And while it's hard to predict demand for the Pre, preliminary analysis suggests Palm (PALM) will make a healthy profit from the units it does sell. Judging from a preliminary estimate by market researcher iSuppli, the Pre will cost about $138 to build. That would amount to 46% of the $300 iSuppli expects Palm to charge Sprint for the device; Sprint is likely to sell the handset for $200, after a $100 subsidy, iSuppli speculates. Palm declined to comment on iSuppli's analysis. ↘p32 first impression | nobody else | hankie | throng ↘e31

"Once again, he asked again to be part" of Sunday's rally, Mr. Zuma said, which was called Siyanqoba, or "We are winning." ←p33

Mr. Mandela sat on a sofa during the event. He was dressed in a bright yellow T-shirt with the party's slogan, "Working together we can do more," across the front. He shook hands with those who greeted him on the stage but otherwise barely moved except to sip water. ←p34

At one point, a short, prerecorded video message from Mr. Mandela was shown on a huge screen. He mentioned the goals of ending poverty and building a nonracial society, and his hopes for a "decisive" A.N.C. victory. ←p35 handshake | western kenya | election observer | multi-party ↘e32

The support of Mr. Mandela, one of the world's most respected statesmen, is a legitimizing boost for Mr. Zuma, 67, whose name has been sullied by allegations of corruption and a rape trial.←p36

Two weeks ago, the corruption case was dropped on procedural grounds, though prosecutors emphasized that they still considered Mr. Zuma guilty of accepting bribes. The rape trial, which resulted in an acquittal, nevertheless produced embarrassing testimony. Mr. Zuma said he had sex with a 31-year-old family friend because she was wearing a short skirt and sitting provocatively. "Zulu culture," he said, left him no option but to oblige her. ←p37

Mr. Zuma has treated Mr. Mandela with great respect; the men share the bond of having been imprisoned together on Robben Island.↘p38 deputy president | chief prosecutor | anti-apartheid | african national congress ↘e33

31 dividing content into content regions based on number of characters in the region

32 calculating vectors of content regions

33 calculating relevance scores between each vector of content regions and each vector in term vector table

34 For each vector of content regions, selecting a group of extending terms from a group of terms in which the term vectors have the largest relevance scores with vector of the content regions

35 rendering each group of extending terms around each content region

FIG. 12

Document 4

And while it's hard to predict demand for the Pre, preliminary analysis suggests Palm (PALM) will make a healthy profit from the units it does sell. Judging from a preliminary estimate by market researcher iSuppli, the Pre will cost about $138 to build. That would amount to 46% of the $300 iSuppli expects Palm to charge Sprint for the device; Sprint is likely to sell the handset for $200, after a $100 subsidy, iSuppli speculates. Palm declined to comment on iSuppli's analysis. ◄─── p41 nokia | motorola | research in motion | msft ◄─── e41

Researchers at iSuppli typically conduct teardown analyses of popular consumer electronic devices to estimate their costs and identify key suppliers. This analysis is an estimate, however, because there is not yet a product to tear down. So far, iSuppli has been able to identify two suppliers, says iSuppli analyst Tina Teng. Chipmaker Texas Instruments (TXN) is supplying Palm with an $11 applications chip from the so-called OMAP family of chips aimed at handsets, and wireless-chip maker Qualcomm (QCOM) is the most likely supplier of a set of wireless chips that will let the Pre run on Sprint's wireless voice and data network. Other suppliers are not definitively known. ◄─── p42 cell-phone | smart phone | computer maker | consumer electronics ◄─── e42

smartphone | battery life | touch-screen | flash memory ◄─── e43

FIG. 13

Document 5

And while it's hard to predict demand for the Pre, preliminary analysis suggests Palm (PALM) will make a healthy profit from the units it does sell. Judging from a preliminary estimate by market researcher iSuppli, the Pre will cost about $138 to build. That would amount to 46% of the $300 iSuppli expects Palm to charge Sprint for the device; Sprint is likely to sell the handset for $200, after a $100 subsidy, iSuppli speculates. Palm declined to comment on iSuppli's analysis. ←p51 nokia | motorola | research in motion | msft ←e51

Researchers at iSuppli typically conduct teardown analyses of popular consumer electronic devices to estimate their costs and identify key suppliers. This analysis is an estimate, however, because there is not yet a product to tear down. So far, iSuppli has been able to identify two suppliers, says iSuppli analyst Tina Teng. Chipmaker Texas Instruments (TXN) is supplying Palm with an $11 applications chip from the so-called OMAP family of chips aimed at handsets, and wireless-chip maker Qualcomm (QCOM) is the most likely supplier of a set of wireless chips that will let the Pre run on Sprint's wireless voice and data network. Other suppliers are not definitively known. ←p52 cell-phone | smart phone | computer maker | consumer electronics ←e52

56% of estimated revenue smartphone | battery life | touch-screen | flash memory ←e53

FIG.15

METHOD AND SYSTEM FOR EXTENDING CONTENT

FIELD OF INVENTION

The invention relates to the information processing field, more specifically, to method and system for extending content to enrich information and knowledge that users can consume.

BACKGROUND OF INVENTION

The Internet, which is a worldwide network of interconnected networks and computers, makes available a wide variety of information through billions of hyperlinked "web page" to users. Among these masses of hard-linked content information, there is a tremendous amount of content-related information linkages that are missing and not explored due to the scale and intellectual complexity of finding such related information.

Also, when users browse content pages, they are eager to find more information that is related to the content they are reading. In the web information age, that kind of extended and enriching information that is best matched to the original content is often beyond the original authors' grasp.

The current art relies on human editors to comprehend the content or computer programs to search through the content to find some words to add related information to the original content.

There are at least two shortcomings in such a system, the first is that since the extending content is given simply corresponding to a whole document, while several subjects with different meaning exist in the whole document, there is no way to give the extending content respectively directed to these subjects. The second is since the extending content is given manually, the efficiency is low and the relevance is inaccurate.

The purpose of this application is to solve the problem, in which the content is divided into content regions, and the extending keywords relevant to the content of a current content region are found based on semantic relevance. The extending information provided by the keywords which are seamless extending of the initial content in semantics and integrated with the content, is often beyond expectation for a content creator or a user. This will significantly serve to help or expand the user's understanding of the content.

SUMMARY OF THE INVENTION

An object of the present invention is to provide a method for extending content, comprising: dividing the content into at least one of a plurality of content regions; calculating a vector for each of the content regions; calculating a relevance score between each of the vector of the content regions and each term vector in a terms vector table; for each of the content regions, selecting a group of extending terms from a group of terms in which the term vectors have the largest relevance scores with the vector of the content region; and rendering the group of extending terms around each of the content regions.

Another object of the present invention is to provide a system for extending content, comprising: a dividing unit for dividing the content into at least one of a plurality of content regions; a vector calculation unit for calculating a vector for each of the content regions; a relevance score unit for calculating a relevance score between each of the vector of the content regions and each term vector in a terms vector table; an extending terms selection unit for each of the content regions, selecting a group of extending terms from a group of terms in which the term vectors have the largest relevance scores with the vector of the content region; a rendering unit for rendering the group of extending terms around each of the content regions.

Still further object of the present invention is to provide a computer program comprising instructions that when executed cause a computer to perform operations comprising: dividing the content into at least one of a plurality of content regions; calculating a vector for each of the content regions; calculating a relevance score between each vector of the content regions and each term vector in a terms vector table; for each of the content regions, selecting a group of extending terms from a group of terms in which the term vectors have the largest relevance scores with the vector of the content region; rendering the group of extending terms around each of the content regions.

DESCRIPTION OF THE DRAWINGS

The above content and the those with respect to other aspect, as well as the features and advantages of the particularly preferred embodiments of the present invention will be more apparent from the detailed description with reference to the drawings. Wherein:

FIG. 1 illustrates terms representation and combination.

FIG. 2 illustrates a term-document matrix.

FIG. 3 illustrates the formula of reducing a high dimensional (r dimension) term space to a low dimensional (k dimension) term space.

FIG. 4 illustrates a term vector table.

FIG. 6 illustrates how to composite a query vector based on a term vector table.

FIG. 7 is a first embodiment according to the present invention;

FIG. 9 is a second embodiment according to the present invention;

FIG. 11 is a third embodiment according to the present invention;

FIG. 12 is a flow chart 30 for implementing the embodiment shown in FIG. 11;

FIG. 13 is a fourth embodiment according to the present invention;

FIG. 15 is a fifth embodiment according to the present invention;

In all the appended drawings, the same reference number shall be understood as the same unit, feature and structure.

DETAILED DESCRIPTION OF THE PREFERRED EMBODIMENT

The content defined in the specification, such as the particular structure and unit, is used to help thoroughly understand the preferable embodiments of the present invention.

Therefore, various changes and modifications can be made to the embodiments described in the invention according to the common techniques in the art without departing from the scope and spirit of the present invention. Therefore, for clarity and simplicity, the description of known functions and structures in the art is omitted.

Those skilled in the art could utilize a large number of semantic search technologies in the art to easily construct term vectors and document vectors. Among them, the modeling method of the latent semantic indexing (LSI) is the most representative. In the following, the principle of the latent semantic indexing will be introduced, which does not exclude other methods of semantic search to be used with the present invention.

A particular example will be described herein to explain the LSI more easily. Assuming that the documents consist of titles of 17 books.

A particular example will be described herein to explain the LSI more easily. Assuming that the documents consist of titles of 17 books.

In FIG. 1, the underlined words represent terms. Of course, for those skilled in the art, there are many other rules for selecting terms including increasing or reducing the number of the terms, and changing the manner of combination of the terms, etc.

FIG. 2 is a 16×17 term-document matrix, which is referred to as A. Rows represent the terms, and columns represent the documents. The elements of the matrix are the number of occurrences of each term in a particular document.

By way of singular value decomposition, the term-document matrix A is decomposed into a product form of three matrices, that is, $$A=U\Sigma V^T \quad (1)$$

Wherein, $\Sigma$ is the diagonal matrix of the singular values.

FIG. 3 is a dimension reduction operation of LSI method. A higher-dimension (r-dimension) term space is reduced to a lower-dimension (k-dimension) term space.

For illustration purpose, the value of k is selected as 2, which means that the original term space is reduced to a two-dimensional term space. The first two columns of matrix U representing the terms in two-dimensional space as the term vector table, is shown as FIG. 4.

With these basic term vectors, new vectors can be composited according to $$v=q^T U_k \Sigma^{-1}_k \quad (2)$$

For example, document vector $B_i$ and the query request entered by users can both be composited by analyzing the terms cited. It should be appreciated by those skilled in the art that the weight of a term vector may also be considered in compositing the vector.

Figure 5:
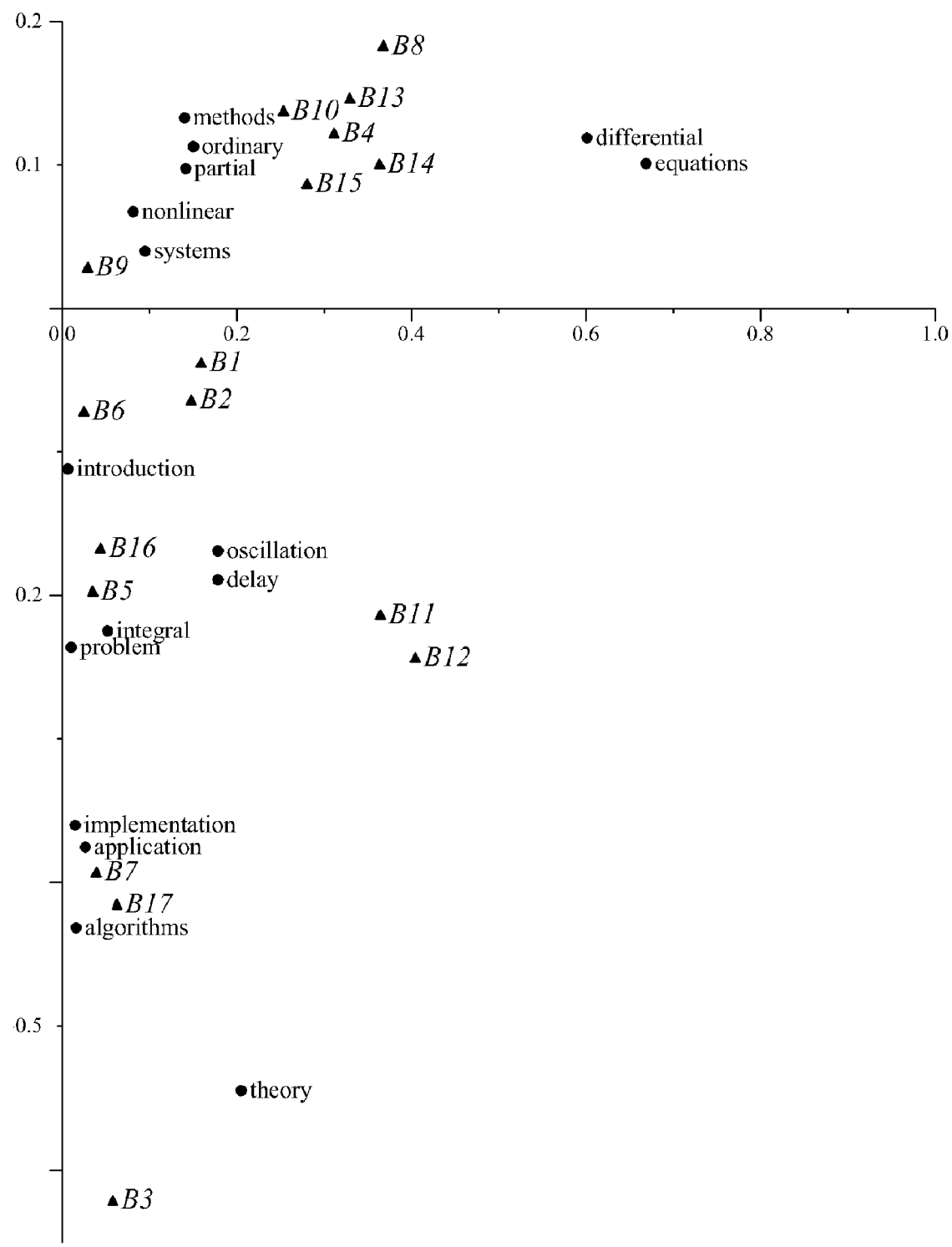
FIG. 5 illustrates the projection relationship between terms and documents in a reduced space of two dimension.

FIG. 5 plots the relationship of terms and documents in the two-dimensional space. The smaller the angle between term vectors or conversely, the larger the cosine value of the angle is, the larger the relevance score between two terms is. Taking the term "oscillation" as an example, its angle with "delay" is the smallest in all terms, which makes "delay" the most relevant one with "oscillation".

When a user enters a query expression, for example "application theory", the system, by way of analyzing the two terms "application" and "theory" in the expression, composites two term vectors according to equation 2, as shown in FIG. 6, thereby obtaining a vector for the query expression.

The cosine of the angle between each document vector and the query expression vector is computed, and the greater the cosine is the more relevant the document and the query expression are.

The relevance score of a term and a document is represented by the cosine value of the angle between document vector and the query expression vector. For example, the cosine of the angle between the term "nonlinear" and the document vector of B9 is the greatest, so the document most relevant to "nonlinear" is B9.

In conjunction with the above principle, an term vector table can be obtained by performing the foregoing process with a sufficient number of available documents. The method to compute the document vector comprises of: extracting the terms in the document; finding the term vectors from the term vector table, and compositing these vectors into a document vector as shown in equation 2. The present invention is described based on the term vector table.

Relevant references are as follows:

1. M. W. Berry. S. T. Dumaiis & G. W. O'Brien. Using Linear Algebra Intelligent Information Retrieval. Computer Science Department CS-94-270 1994-12

2. Ju Bin. The Research and Implementation of Latent Semantic Index in Chinese Language Information Search. Computer Engineering 2007-03

3. Chen Yue, Guo Li. Latent Semantic Search and its Application. Information Search Techniques. Column 6, 2001.

4. Michael W. Berry, Paul G. Young. Using latent semantic indexing for multilanguage information retrieval. Volume 29, Number 6/1995-12

FIG. 7 is a first embodiment according to the present invention. In the embodiment, the document 1 has two paragraphs, p11 and p12 that are divided into two content regions. Each content region has extending keywords e11 and e12 rendered nearby respectively.

Figure 8:
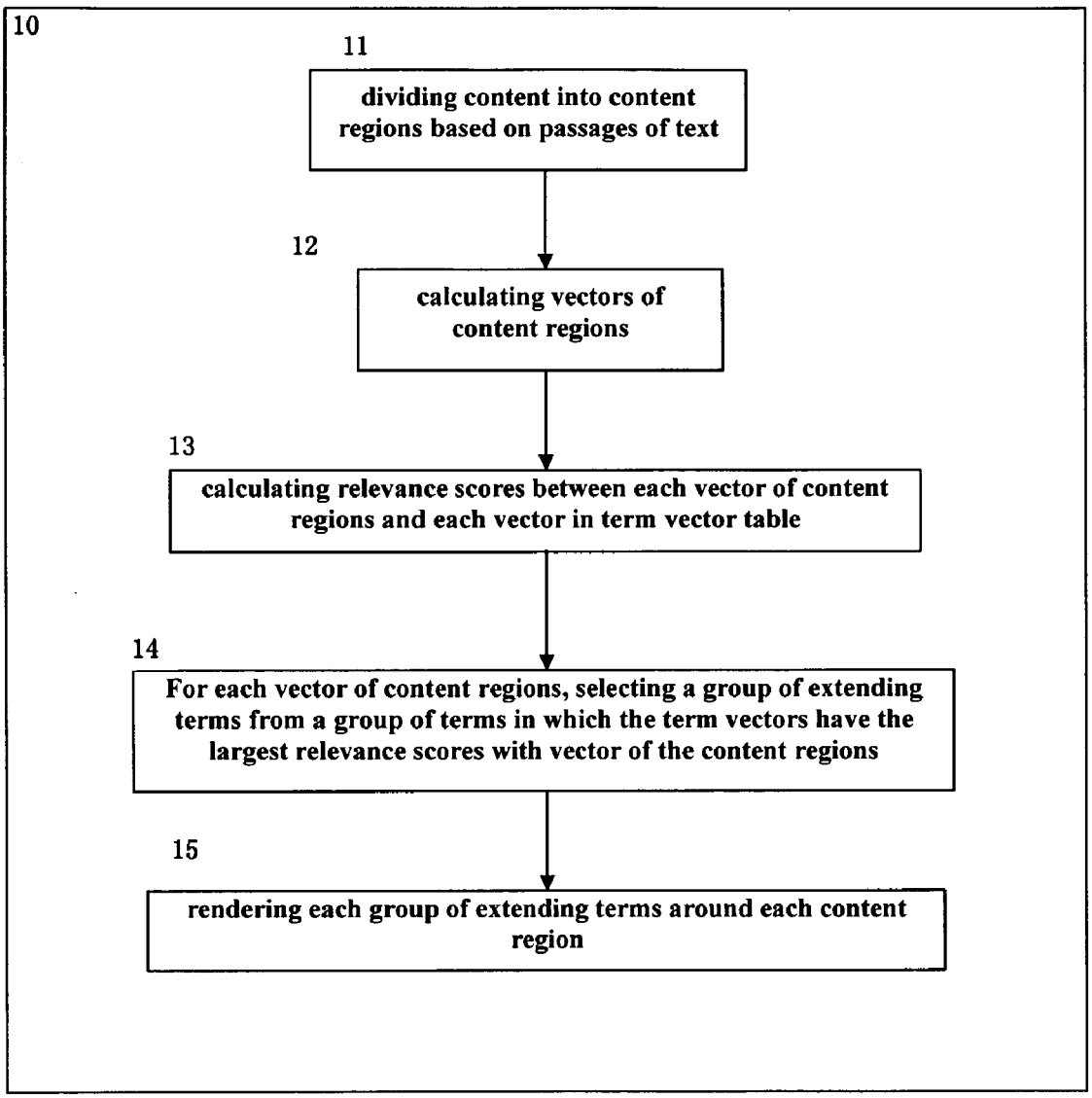
FIG. 8 is a flow chart 10 for implementing the embodiment shown in FIG. 7.

FIG. 8 is a flow chart 10 for implementing the embodiment shown in FIG. 7. In Step 11, the document 1 is divided into two content regions a11 and a12 according to paragraphs. In Step 12, each vector of the content regions is calculated as v(a11) and v(a12). In Step 13, the relevance score between each vector of content regions and each vector in the term vector table is calculated. The relevance score refers to the angle or cosine between the vectors. In Step 14, number of terms for example 4 terms (not limited to this number), which have the highest relevance score, are selected as the extending keywords of the corresponding content region. In the example, two groups of extending keywords are "nokia|motorola|research in motion|msft", "cellphone|smart phone|computer maker|consumer electronics", respectively. Each extending keyword is separated by a special symbol, such as "|". In step 15, when the content is requested for rendering, the extending keywords are rendered around the corresponding content region.

FIG. 9 is a second embodiment according to the present invention. In the embodiment, the document 2 has six passages, p21-p26 that are divided into three content regions, a21-a23, respectively. Wherein, a21 includes p21-p22, a22 includes p23-p25, and a23 includes p26. Each content region has extending keywords e21, e22 and e23 rendered nearby respectively.

Figure 10:
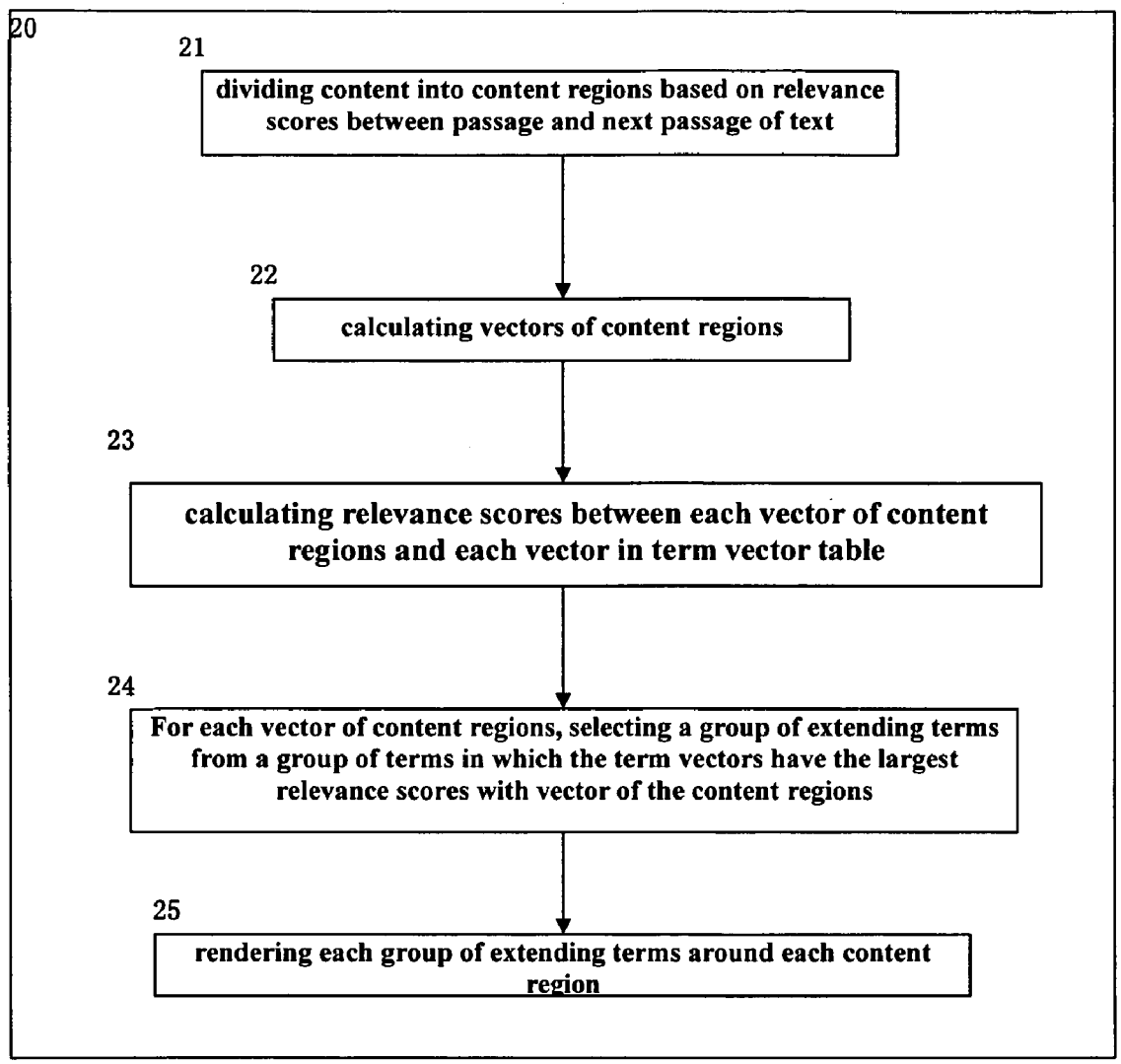
FIG. 10 is a flow chart 20 for implementing the embodiment shown in FIG. 9.

FIG. 10 is a flow chart 20 for implementing the embodiment shown in FIG. 9. The content in the embodiment is document 2 that has six paragraphs. In Step 21, the vectors v (p21) to v (p26) of passages p21-p26 of the document 2 are calculated. Starting from the first vector v (p21), the relevance score between the vector of the current paragraph and the vector of the next paragraph is calculated. If the relevance score is greater than a certain threshold, which means two paragraphs have the almost same semantic meaning, then the paragraph remains in the same content region, for example, among these paragraphs (p21, p22), (p23, p24, p25), (p26), the relevance scores of the vectors of adjacent paragraphs are greater than the threshold, therefore the three group of paragraphs remain in the same content regions, as a21=(p21, p22), a22=(p23, p24, p25), a23=(p26), respectively. In Step 22, the vectors of each content region are calculated, v(a21)-v(a23), respectively. In Step 23, the relevance score between the vector of each content region and each vector in the term vector table is calculated. The relevance score refers to the angle or cosine between the vectors. In Step 24, following in order of relevance, the relevant terms are compared in turn to see whether they appear in the corresponding content region or not, and if so, then not taking them as the extending keywords, and thus finally obtaining N extending keywords, for example 4 (not limited to this number). Each extending keyword is separated by a special symbol, such as "|". Certainly, the above comparison with the content region can be changed to comparison with whole document, and this can be readily realized for those skilled in the art. In step 25, when the content is requested to render, the extending keywords are rendered around the corresponding content region.

FIG. 11 is a third embodiment according to the present invention. In the embodiment, there is a document 3 has eight paragraphs, p31-p38 that are divided into three content regions, a31-a33, respectively. Wherein, a31 includes p31-p32, a32 includes p33-p35, and a33 includes p36-p38. Each content region has extending keywords e31, e32 and e33 rendered nearby respectively.

FIG. 12 is a flow chart 30 for implementing the embodiment shown in FIG. 11. The content in the embodiment is document 3 that includes eight paragraphs. In Step 31, starting from the initial paragraph p31, several adjacent paragraphs are assigned into the same content region, so that the word number of each content region is greater than or equal to a preset threshold, such as 300 words, but the word number must also remain smaller than the preset threshold when the word number of the last paragraph in the content region is subtracted. For example, the total word number of paragraphs p31-p33 is greater than 300, but smaller than 300 if the word number of the last paragraph p33 is subtracted. According to this mode, there are three content regions, a31=(p31, p32), a32=(p33, p34, p35), a33=(p36, p37, p38), respectively. In Step 32, the vectors of each content region are calculated, v(a31)-v(a33), respectively. In Step 33, the relevance score between the vector of each content region and each term vector in the term vector table is calculated. The relevance score refers to the angle or cosine between the vectors. In Step 34, following in order of the relevance, the relevant terms are compared in turn to see whether they appear in the whole document or the extending keywords of previous content region or not, and if so, then not taking them as the extending keywords, and thus finally obtaining N extending keywords. For example 4 (but not limited to this number). Each extending keyword is separated by a special symbol such as "|". Certainly, the above comparison with whole document is changed to comparison with a corresponding content region, and this can be readily realized for those skilled in the art. In step 35, when the content is requested to render, the extending keywords are rendered around the corresponding content region.

FIG. 13 is a fourth embodiment according to the present invention. In the embodiment, there is a content including two paragraphs, p41-p42, respectively, and an audio file. The paragraphs each have extending keywords e41 and e42 rendered nearby respectively. The audio file has also extending keywords e43 rendered nearby respectively.

Figure 14:
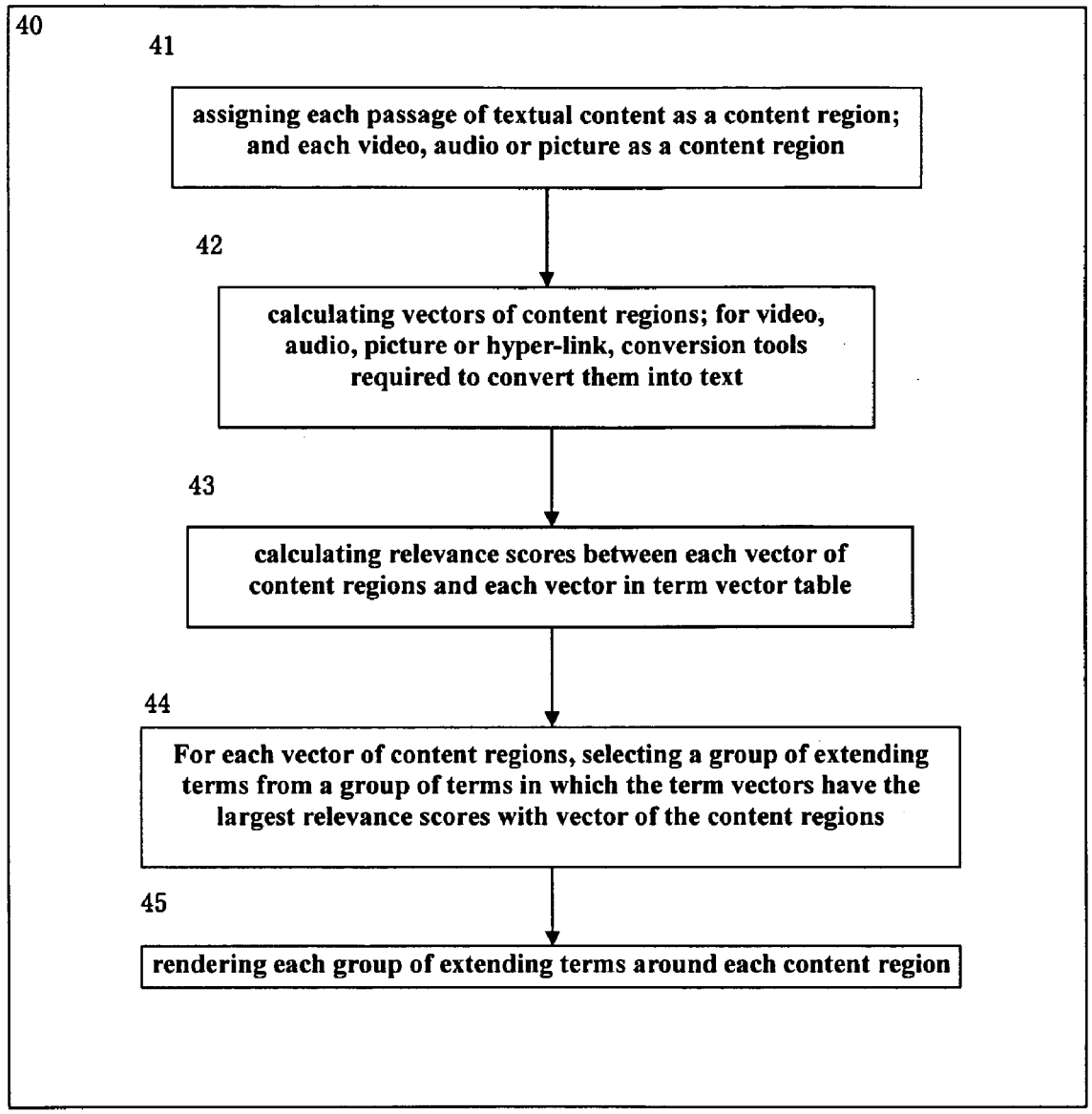
FIG. 14 is a flow chart 40 for implementing the embodiment shown in FIG. 13.

FIG. 14 is a flow chart 40 for implementing the embodiment shown in FIG. 13. The content in the embodiment is a document 4 that has two paragraphs of textual content and an audio file. In Step 41, the textual content in the document 4 is divided according to paragraphs, thereby obtaining two content regions, a41 and a42, respectively, and the audio file therein is determined to be a separate content region. In Step 42, the vectors of each textual content region are calculated, v(a41) and v (a42) respectively. For the audio file, it uses the speech-to-text technique in the arts to convert the audio file to the corresponding text, then calculate the vector of the converted text as the vector of the content that is the audio file. If the audio file therein is replaced by an video file, then the audio part in the video file is converted into an audio text by means of the speech-to-text technique, and/or the caption in the video file is converted into a caption text by an optical-character recognition function readily available in the arts, and then the vector of the audio text and/or caption text is calculated as the vector of the video file. In addition, for a video containing a caption stream, the caption stream can be converted into a caption text directly by the existing techniques, and then the vector is calculated through the above method. Moreover, if the content includes pictures, then characters in the pictures are converted into a text by the optical character recognition function, and then the vector of the text is calculated as the vector of the pictures. In Step 43, the relevance score between the vector of each content region and each vector in the term vector table is calculated. Wherein, the relevance score refers to the angle or the cosine between the vectors. In Step 44, a number of terms therein, for example 4 terms (but not limited to this number), which have the highest relevance score, are selected as the extending keywords of the corresponding content region. In step 45, when the content is requested to render, the extending keywords are rendered around the corresponding content region.

FIG. 15 is a fifth embodiment according to the present invention. In the embodiment, there is a content including two paragraphs, p51 to p52, respectively, and a Hyperlink, which points to another file. The paragraphs each have extending keywords e51 and e52 rendered nearby respectively. The Hyperlink also has extending keywords e53 rendered nearby respectively.

Figure 16:
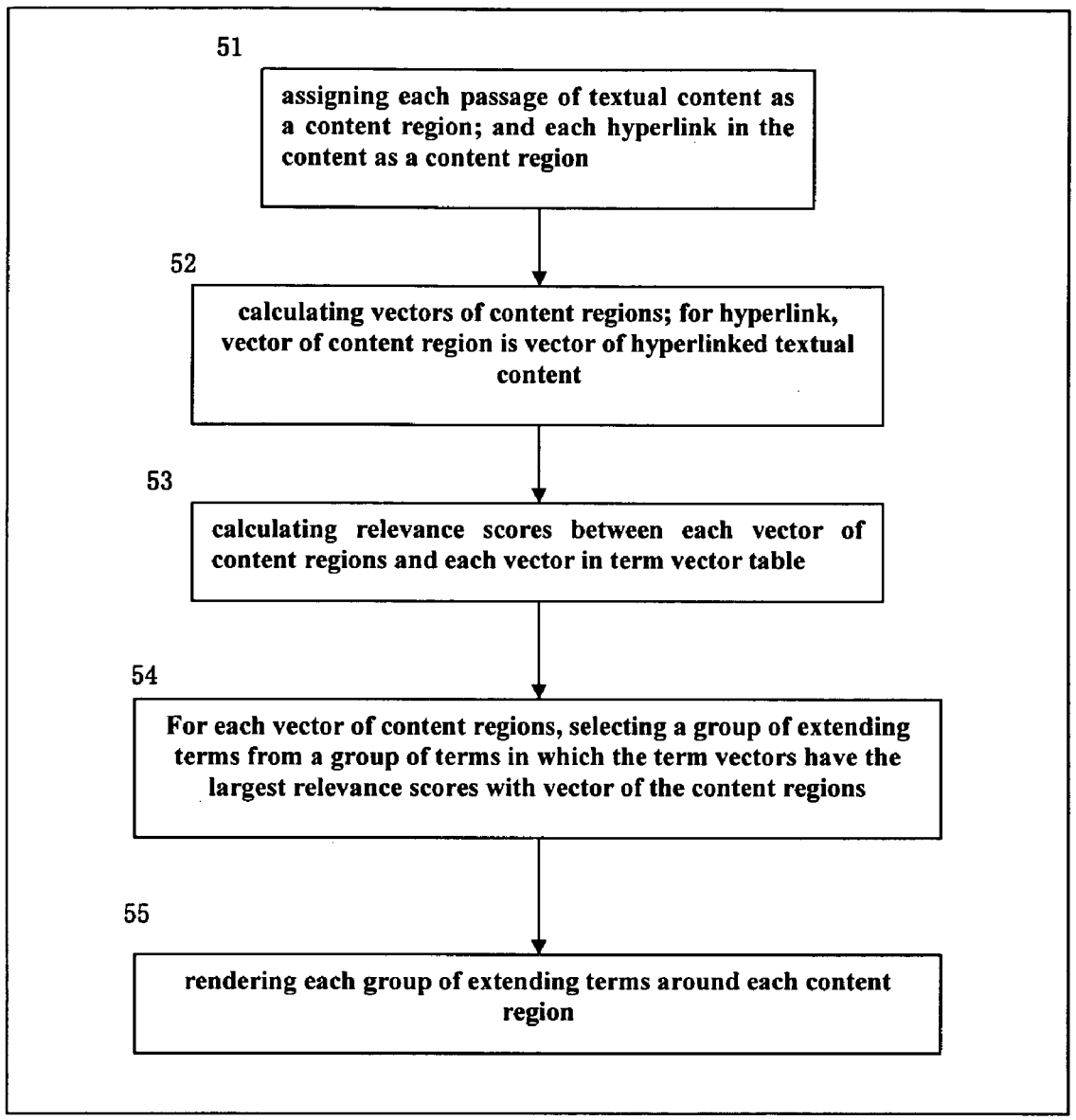
FIG. 16 is a flow chart 50 for implementing the embodiment shown in FIG. 15.

FIG. 16 is a flow chart 50 for implementing the embodiment shown in FIG. 15. The content in the embodiment is a document 5 that has two paragraphs of textual content and a Hyperlink. In Step 51, the textual content in the document 5 is divided according to paragraph, thereby obtaining two content regions, a51 and a52 respectively, and the Hyperlink therein is determined to be a separate content region. In Step 52, the vectors of each content region are calculated, v(a51) and v(a52), respectively. For the Hyperlink, the vector of the content is calculated as the vector of the content to which the Hyperlink points. Namely, the non-textual content in the linked document is retrieved and converted into the textual content in similar fashion to the fourth embodiment, and the textual content are composited to calculate the vector of the content region. In Step 53, the relevance score between the vector of each content region and each vector in the term vector table is calculated. The relevance score refers to the angle or cosine between the vectors. In Step 54, number of terms, for example 4 terms (but not limited to this number), which have the highest relevance score, are selected as the extending keywords of the corresponding content region. In step 55, when the content is requested for rendering, the extending keywords are rendered around the corresponding content region.

Figure 17:
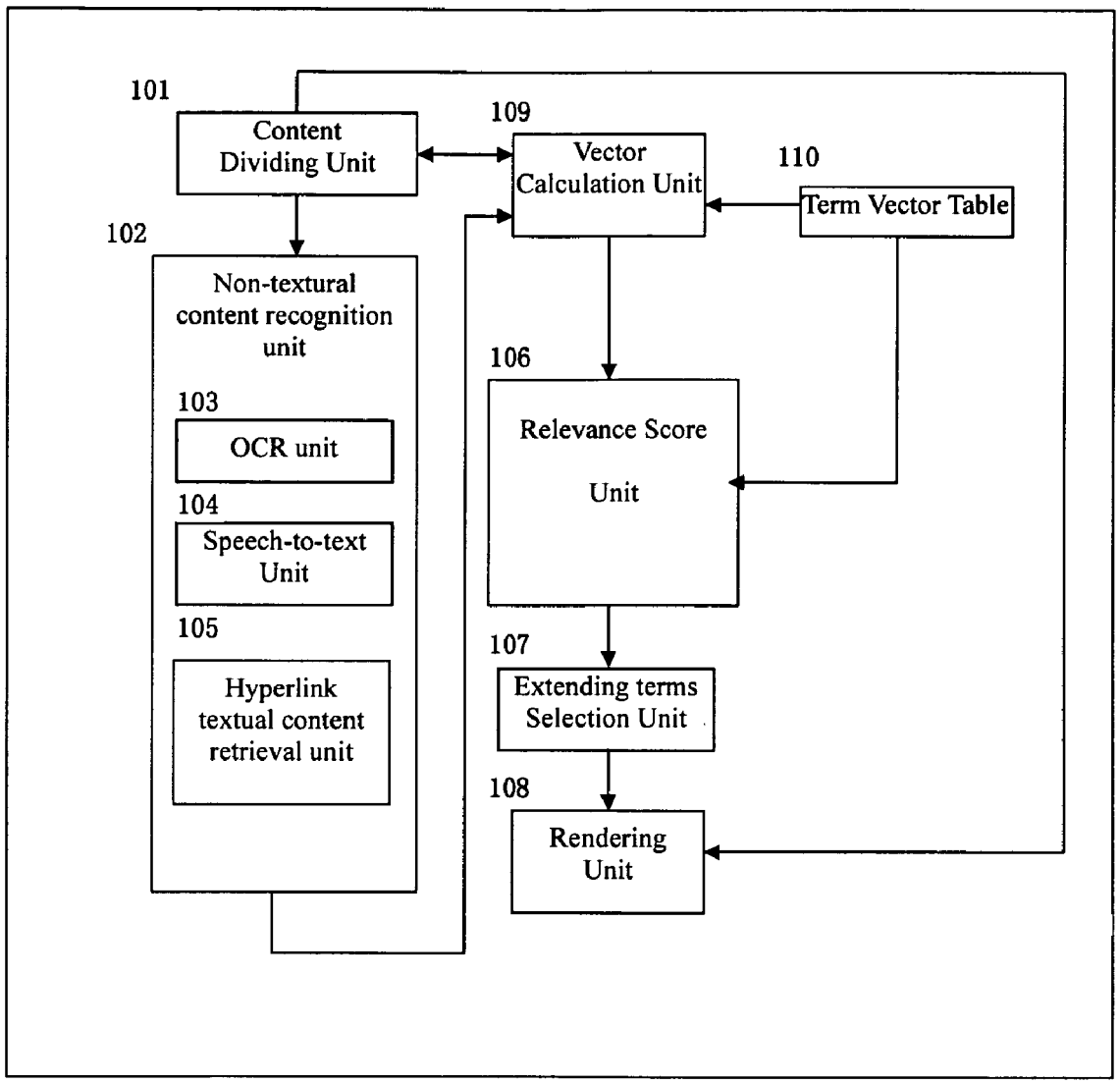
FIG. 17 is system diagram for implementing a system 100 of the embodiments of the present invention.

FIG. 17 is structural diagram of implementing a system 100 of the embodiments of the present invention. The system comprises: a content dividing unit 101, a non-textual content recognition unit 102, a vector calculation unit 109, a relevance score unit 106, an extending terms selection unit 107, a rendering unit 108, a term vector table 110. The non-textual content recognition unit 102 comprises: an OCR unit 103, a speech-to-text unit 104 and a hyperlink textual content retrieval unit 105.

The content dividing unit 101 is used to divide the content, and it calculates the paragraph and the content region vectors through the vector calculation unit 109. If some content regions have non-textual content after dividing, for example audio, video, picture or Hyperlink, then it submits these content to the non-textual content recognition unit 102, and the non-textural content are converted into textual content by a corresponding function unit, and sent to the vector calculation unit 109 to get the corresponding vector of content region. In addition, for the textual content, it is sent directly to the vector calculation unit 109 by the content dividing unit 101. According to the received document and the term vector table 110, the vector calculation unit 109 calculates the vector of the content region according to the existing semantic search techniques. The relevance score unit 106 is also used to calculate the relevance score between the vector to be compared and the term vector in the term vector table 110, for example calculating the angle or cosine between the vectors. The relevance score unit 106 sends the comparing results to the extending terms selection unit 107, and the extending keywords are determined by the extending terms selection unit 107. The rendering unit 108 renders the extending keywords around the corresponding content region.

Although the present invention has been described in conjunction with some particular preferred embodiments, it will be apparent to those skilled in the art that variations and modifications to the embodiments may be made without departing from the spirit of the invention and the scope defined by the claims and their equivalents.

I claim:

1. A computer-implemented method for extending content based on the semantic meaning of content, comprising the steps of:
   a) dividing the content into at least one of a plurality of content regions;
   b) calculating a vector for each of the content regions wherein the vector for each of the content regions is composited based on a term vector table, wherein the term vector table is obtained based on the latent semantic indexing using the dimension reduction operation with a sufficient number of available documents;
   c) calculating a relevance score between each of the vector of the content regions and each term vector in the term vector table, wherein the relevance score is the cosine value of the angle between each of the vector of the content regions and each term vector in the term vector table;
   d) for each of the content regions, selecting a group of extending terms from a group of terms in which the term vectors have the largest relevance scores with the vector of the content region;
   e) rendering the group of extending terms around each of the content regions.

2. The method of claim 1, wherein the content comprising at least one of textual content or non-textual content.

3. The method of claim 2, wherein the non-textual content comprising at least one of audio data, video data, picture data or hyperlink data.

4. The method of claim 1, wherein the step d) further comprising: selecting at least one of extending terms, wherein the extending term is not appeared in the content.

5. The method of claim 1, wherein dividing the textual content into at least one of a plurality of content regions further comprising:
   a11) calculating the vector for each paragraph of the textual content;
   a12) calculating the relevance score between two vectors of adjacent paragraphs of the textual content;
   a13) comparing the relevance score with a preset threshold value; if the relevance score is greater than or equal to the preset threshold value, keeping the adjacent paragraph in current content region; otherwise, moving the adjacent paragraphs into next content region;
   a14) repeating step a11) to a14) until the textual content is divided.

6. The method of claim 1, wherein dividing the textual content into at least one of a plurality of content regions further comprising of:
   a21) counting number of words in each paragraph sequentially;
   a22) totaling number of words in contiguous paragraphs;
   a23) comparing the total number of words with a preset threshold value until the total number of words is greater than or equal to the preset threshold value but less than the preset threshold value if not counting last paragraph;
   a24) making the contiguous paragraphs as one content region.

7. The method of claim 6, wherein the preset threshold is a fixed value or dynamically adjusted with the textual length of the content.

8. The method of claim 1, wherein dividing the textual content into at least one of a plurality of content regions further comprising of:
   dividing content based on textual paragraph of the textual content;
   repeating step a) until the textual content is divided.

9. The method of claim 1, wherein at least one of a plurality of the extending terms to the content region are selected from a group of commercial entities-related terms, wherein the group of commercial entities-related terms have the largest relevance scores with the vector of the content region.

10. The method of claim 3, wherein the non-textual content is transformed to textual content, further comprising the steps of:
    converting the audio into a paragraph of text;
    converting the caption in a video into a paragraph of text;
    converting the characters in a picture into a paragraph of text;
    retrieving the hyper-linked file content in a hyper-link as a paragraph of text.

11. A system for extending content based on the semantic meaning of content, comprising:
    a dividing unit for semantically dividing the content into at least one of a plurality of content regions;
    a vector calculation unit for calculating a vector for each of the content regions wherein the vector for each of the content regions is composited based on a term vector table, wherein the term vector table is obtained based on the latent semantic indexing using the dimension reduction operation with a sufficient number of available documents;

a relevance score unit for calculating a relevance score between each of the vector of the content regions and each term vector in the term vector table, wherein the relevance score is the cosine value of the angle between each of the vector of the content regions and each term vector in the term vector table;

an extending terms selection unit for each of the content regions, selecting a group of extending terms from a group of terms in which the term vectors have the largest relevance scores with the vector of the content region;

a rendering unit for rendering the group of extending terms around each of the content regions.

12. The system of claim 11, wherein the content comprising at least one of textual content or non-textual content.

13. The system of claim 12, wherein the non-textual content comprising at least one of audio data, video data, picture data or hyperlinked data.

14. The system of claim 11, wherein the extending terms selection unit further comprising: selecting at least one of extending terms, wherein the extending term is not appeared in the content.

15. The system of claim 11, wherein the textual content dividing unit further comprising:
- a11) calculating the vector for each paragraph of the textual content;
- a12) calculating the relevance score between two vectors of adjacent paragraphs of the textual content;
- a13) comparing the relevance score with a preset threshold value; if the relevance score is greater than or equal to the preset threshold value, keeping the adjacent paragraph in current content region; otherwise, moving the adjacent paragraphs into next content region;
- a14) repeating step a11) to a14) until the textual content is divided.

16. The system of claim 11, wherein the dividing unit further comprising of:
- a unit for counting number of words in each paragraph sequentially;
- a unit for totaling number of words in contiguous paragraphs;
- a unit for comparing the total number of words with a preset threshold value until the total number of words is greater than or equal to the preset threshold value but less than the preset threshold value if not counting last paragraph;
- a unit for making the contiguous paragraphs as one content region.

17. The system of claim 16, wherein the preset threshold is a fixed value or dynamically adjusted with the textual length of the content.

18. The system of claim 11, wherein the textual content dividing unit further comprising of:
- a31) dividing content based on textual paragraph of the textual content;
- a32) repeating step a31) until all the textual content is divided.

19. The system of claim 11, wherein at least one of a plurality of the extending terms to the content region are selected from a group of commercial entities-related terms, wherein the group of commercial entities-related terms have the largest relevance scores with the vector of the content region.

20. The system of claim 13, wherein the non-textual content is transformed to textual content, further comprising the sub-unit of:
- a speech-to-text unit for converting the audio content into a paragraph of text;
- a caption conversion unit for converting the caption in the video into a paragraph of text;
- an optical character recognition unit for converting the characters in a picture into a paragraph of text; or a hyperlink textual content retrieval unit for retrieve the hyper-linked file content as a paragraph of text.

21. A computer storage medium encoded with a computer program, the computer program comprising instructions that when executed cause a computer to perform operations for extending content based on the semantic meaning of content comprising: dividing the content into at least one of a plurality of content regions;

calculating a vector for each of the content regions wherein the vector for each of the content regions is composited based on a term vector table, wherein the term vector table is obtained based on the latent semantic indexing using the dimension reduction operation with a sufficient number of available documents; calculating a relevance score between each of the vector of the content regions and each term vector in the terms vector table, wherein the relevance score is the cosine value of the angle between each of the vector of the content regions and each term vector in the term vector table; for each of the content regions, selecting a group of extending terms from a group of terms in which the term vectors have the largest relevance scores with the vector of the content region; rendering the group of extending terms around each of the content regions.

* * * * *